Dec. 2, 1958 — I. SHAPIRO — 2,862,653
APPARATUS
Filed June 26, 1956

*INVENTOR*
Isadore Shapiro by Adams, Forward & McLean
ATTORNEYS ced Dec. 2, 1958

2,862,653

APPARATUS

Isadore Shapiro, Pasadena, Calif.

Application June 26, 1956, Serial No. 593,939

2 Claims. (Cl. 230—85)

This invention relates to circulation of gaseous material and in particular provides a displacement-type gas pump employing "weightless valves" and an uniform linear displacement motion to provide a constant flow rate circulating system.

Although many devices for circulating gases are known, none of these have been designed to provide a constant rate of gas flow. Essentially such pumps include two principal components—a double-acting valve system and a mechanical displacement system. Regardless of the uniformity in rate of displacement in the mechanical system, the valve system, which is normally operated by gravity and controls the direction of gas flow, prevents a constant rate of gas flow, especially at sub-atmospheric pressures because of the weight of the valves. At low pressures the gas being circulated must undergo extensive compression before the valve is raised from its seat and the consequent local compression under the valve produces an irregularity of flow which cannot as a practical matter be avoided by controlling the rate of displacement or the like.

It is a principal object of this invention to provide a mechanical displacement system capable of uniformly constant rate of displacement which in conjunction with a "weightless" valve system is capable of circulating gas at a constant rate.

It is an important object of this invention to provide a double-acting pump having gravity seated valves which can be rendered "weightless" at the moment their operation is desired, thus avoiding local compression of the gas being circulated.

It is another object of this invention to provide a displacement pump having a double-acting system of valves which can be rendered "weightless" in synchronism with the operation of the mechanical displacement system.

These and other objects of this invention are essentially achieved by employing a piston which is reciprocable in a cylinder, and which is driven by a cam at a constant linear rate of speed and by employing gravity seated valves which contain paramagnetic cores or the like and an electromagnetic device located adjacent to each valve which when energized creates a magnetic field passing through the paramagnetic core of the associated valve overcoming the effect of gravity on the valve and thus rendering the valve "weightless."

For a more complete understanding of the practical application of the principles of this invention, reference is made to the appended drawings in which.

Figure 1:
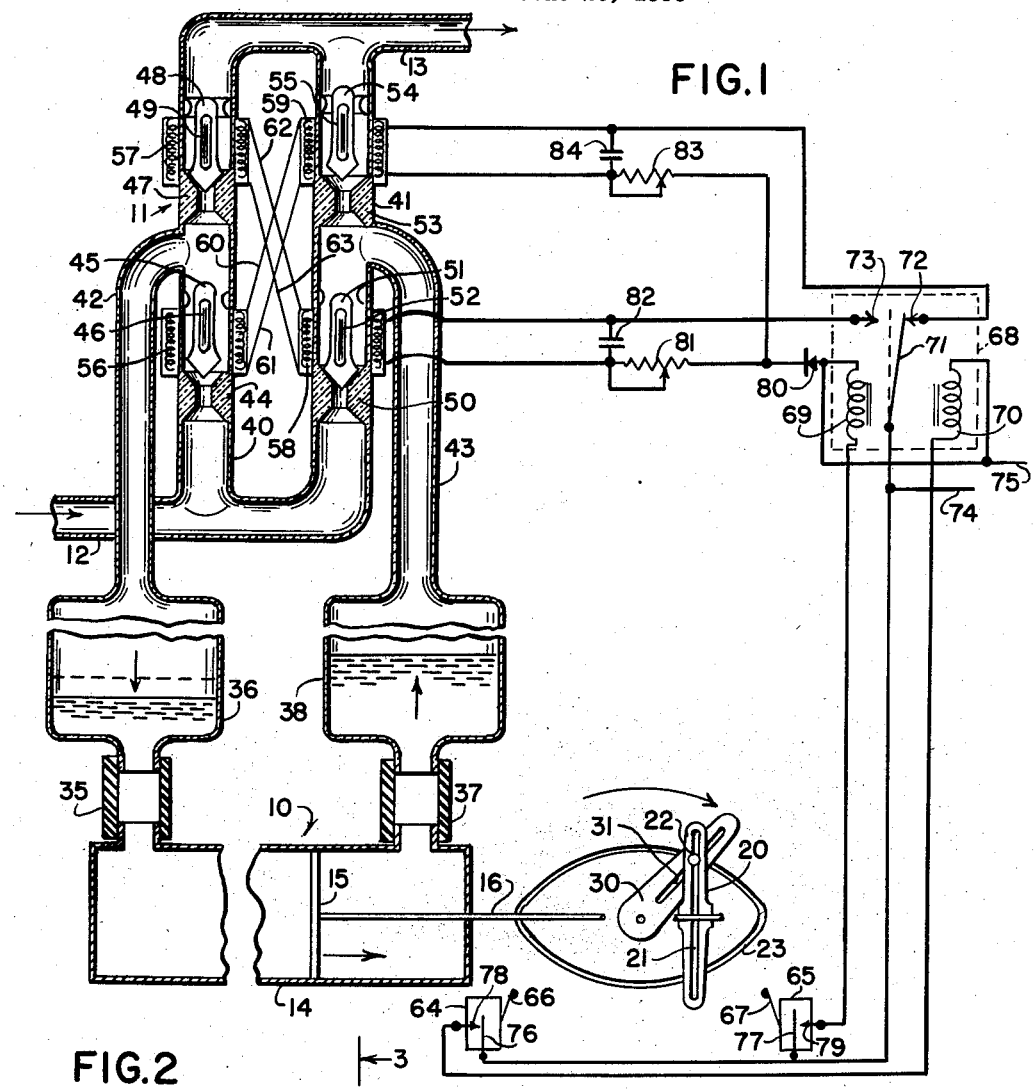
Figure 1 is a schematic diagram of a double-acting pump constructed in accordance with the principles of this invention.

Referring to the drawings, the reference numeral 10 indicates a double-acting mechanical displacement system for moving a gas which is valved by a double-acting valve system 11 to draw gas from an intake line 12 and to expel it through an exhaust line 13.

Figure 2:
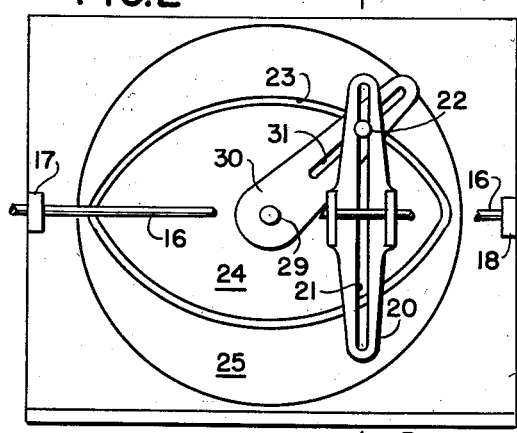
Figure 2 is an elevational view of a portion of the pump illustrated in Figure 1.

Displacement system 10 includes a horizontal cylinder 14 in which is positioned a horizontally reciprocable piston 15 operated by a piston rod 16 slidably received (see Figure 2) by a pair of guide lugs 17 and 18 located on a frame 19. Intermediate lugs 17 and 18 an arm 20 is affixed to piston rod 16. Arm 20 is provided with vertical slot 21 which slidingly receives a stud 22 carried in horizontal position in a cam slot 23 defined between two plates 24 and 25 mounted in vertical alignment on the face of frame 19.

Figure 3:
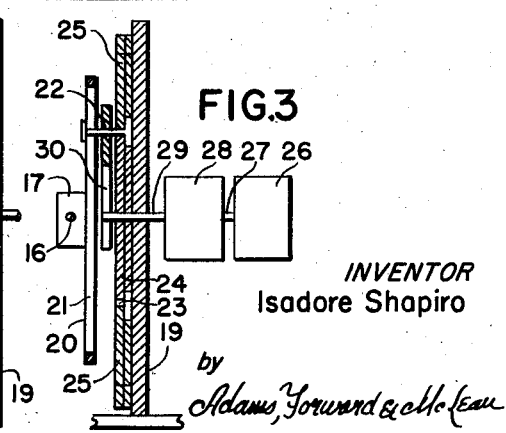
Figure 3 is a cross-sectional view taken at line 3—3 in Figure 2.

A constant speed motor 26 (see Figure 3) is arranged with its output shaft 27 driving a variable speed transmission 28, the output shaft 29 of which extends centrally through frame 19 and plate 24 and carries a driven arm 30. Arm 30 thus is rotated by shaft 29 across the face of cam plates 24 and 25 and behind vertically slotted arm 20. Driven arm 30 has a radial slot 31 (see Figure 2) which slidingly receives stud 22, and thus as arm 30 is rotated stud 22 traverses cam slot 23 and imparts a horizontal reciprocating movement to vertically slotted arm 22. Cam slot 23 is constructed such that equal angles of revolution of arm 30 give equal horizontal displacement of piston rod 16.

At one end cylinder 14 is provided with a vertical leg 35 (see Figure 1) which at its lower end communicates with the interior of cylinder 14 and which at its upper end communicates with a reservoir 36. A similar vertical leg 37 is connected at its lower end to the other end of cylinder 14 communicating with the interior thereof and is connected at its upper end with the interior of a reservoir 38. Cylinder 14 is filled with a suitable fluid such as mercury to the extent that the upper surfaces of mercury retained on each side of piston 16 lie in reservoirs 36 and 38.

Between intake conduit 12 and exhaust conduit 13 are a pair of vertical glass conduits 40 and 41 which at their upper ends connect with exhaust conduit 13 and which at their lower ends connect with intake conduit 12. The center of conduit 40 is joined to and connects to one end of a conduit 42 which at its other end is connected to the gas space in reservoir 36 above the level of mercury contained therein. The center of conduit 41 is similarly connected by a conduit 43 to a gas space above the mercury level in reservoir 38.

Below the junction of conduit 42 an internal valve seat 44 is integrally formed in conduit 40. A glass valve element 45 having an iron core 46 is positioned resting on seat 44. Similarly above the junction of conduit 42 with conduit 40 there is located in conduit 40 an integral annular valve seat 47 on which rests a glass valve element 48 having an iron core 49. Conduit 41 is likewise provided with an integral valve seat 50 located below the junction of conduits 41 and 43 and on which rests a glass valve element 51 having an iron core 52. A fourth integral annular valve seat 53 is formed in conduit 41 above the junction of conduit 41 with conduit 43. A glass valve element 54 having an iron core 55 rests on annular valve seat 53.

A solenoid 56 is wound about conduit 40 adjacent valve element 45, a solenoid 57 is wound about conduit 40 adjacent valve element 48, a solenoid 58 is wound about conduit 41 adjacent valve element 51, and a solenoid 59 is wound about conduit 41 adjacent valve element 54. The windings of solenoids 56 and 59 are connected in parallel by leads 60 and 61 and windings of solenoids 57 and 58 are similarly connected in parallel by leads 62 and 63.

A pair of normally open micro switches 64 and 65 are mounted adjacent frame 19 with their respective actuating elements 66 and 67 positioned to intercept the left and right limits of movement of vertically slotted arm 20. A single pole double throw latching relay 68 having a pair of actuating coils 69 and 70 and a moving pole 71 which latches upon energization of coil 70 with a contact 72 and which latches upon energization of coil 69 with a contact 73 is connected to micro switches 64 and 65 across power lines 74 and 75 such that poles 76 and 77 of micro switches 64 and 65, respectively, are connected together to pole 71 and power line 74 and such that contacts 78 and 79 of micro switches 64 and 65, respectively, are separately connected to power line 75 through coils 70 and 69, respectively. Thus momentary closing of pole 76 on contact 78 produced by left hand movement of arm 20 energizes coil 70 to cause pole 71 to make with contact 72, and similarly momentary contact of pole 77 and contact 79 produced by right hand movement of arm 20 energizes coil 69 to move pole 71 from contact 72 to contact 73.

Power line 75 is also connected through a selenium rectifier 80 and an adjusting resistor 81 to the parallel connection of solenoids 57 and 58, the return lead from which is connected to contact 73. Suitably a condenser 82 is connected in parallel with solenoids 57 and 58. Power line 75 is also connected through selenium rectifier 80 and an adjusting resistor 83 to the parallel connection of solenoids 56 and 59 from which the return lead is connected to contact 72. Suitably a condenser 84 is connected in parallel with solenoids 56 and 59.

In operation with reservoirs 36 and 38 partially filled with a suitable liquid such as mercury, with motor 26 operating and variable speed drive 28 connected to produce a desired rate of operation, gas is drawn through intake duct 12 and exhausted through exhaust duct 13 in the following manner.

Referring to the position shown in Figure 1, it will be noted that as piston 15 moves from left to right, pole 71 is latched on contact 72, thus energizing solenoids 56 and 59 rendering valves 45 and 54 essentially "weightless." At the same time, mercury is withdrawn into cylinder 14 from reservoir 36 at a constant rate and mercury is displaced into reservoir 38 from cylinder 14 at the same constant rate. Thus gas from intake duct 12 is drawn through floated valve 45 into reservoir 36 simultaneously as gas in reservoir 38 is exhausted through floated valve 54 into exhaust duct 13. The rate of movement of course remains constant by reason of the shape of cam 23. As arm 20 reaches its limiting position to the right, micro switch 65 is tripped causing pole 71 to break with contact 72 and close upon contact 73, thus releasing valves 54 and 45 and simultaneously floating valves 48 and 51 in synchronism with the commencement of the return stroke of piston 15 toward the left. Thereupon gas is drawn through duct 12 raising valve 51 into reservoir 38 and gas from reservoir 36 is displaced through valve 48 into exhaust duct 13.

What I claim is:

1. A double-acting gas pump which comprises a pair of vertical conduits of non-magnetic material, an intake duct connected to the lower ends of said conduits, an exhaust duct connected to the upper ends of said conduits, a double-acting mechanical displacement mechanism having a constant linear rate of movement interconnected to said vertical conduits intermediate the lengths thereof, means defining an exhaust valve seat positioned in each said conduit above the connection thereof to said mechanical displacement mechanism, means defining an intake valve seat positioned in each said conduit below the connection thereof to said mechanical displacement mechanism, a valve element including a paramagnetic core positioned on each said valve seat, electromagnetic means positioned externally of each said conduit adjacent each said valve element, whereby each said valve element is rendered "weightless" by energization of the associated electromagnetic means, and means mechanically coupled to said mechanical displacement mechanism and electrically connected to each said electromagnetic means for alternatively energizing said electromagnetic means adjacent the valve elements on the exhaust valve seat in one of said conduits and on the intake valve seat of the other of said conduits in synchronism with operation of said mechanical displacement mechanism.

2. A double-acting gas pump according to claim 1 in which said mechanical displacement system comprises a cylinder, a piston reciprocable in said cylinder, a piston rod connected to said piston, rotary drive means, a cam, and means slidably engaged with said cam, driven by said drive means and slidably engaged with said piston whereby said piston is reciprocated by rotation of said drive means, said cam being cut such that equal angles of rotation of said drive means produce equal linear movements of said piston.

No references cited.